(12) United States Patent
Caeti et al.

(10) Patent No.: US 8,640,820 B2
(45) Date of Patent: Feb. 4, 2014

(54) HIGH-SPEED JET NOISE REDUCTION VIA FLUIDIC INJECTION

(75) Inventors: Ryan B. Caeti, Brooklyn, NY (US); Iraj M. Kalkhoran, Stony Brook, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 172 days.

(21) Appl. No.: 13/348,077

(22) Filed: Jan. 11, 2012

(65) Prior Publication Data

US 2013/0175353 A1    Jul. 11, 2013

(51) Int. Cl.
    *F02K 1/00*    (2006.01)
(52) U.S. Cl.
    USPC ............................ 181/213; 181/220; 415/119
(58) Field of Classification Search
    USPC .................................. 181/220, 213; 415/119
    See application file for complete search history.

(56) References Cited

U.S. PATENT DOCUMENTS

| | | | | |
|---|---|---|---|---|
| 3,572,960 A | * | 3/1971 | McBride | 415/115 |
| 4,122,674 A | * | 10/1978 | Andersson et al. | 60/725 |
| 4,199,295 A | * | 4/1980 | Raffy et al. | 415/115 |
| 4,255,083 A | * | 3/1981 | Andre et al. | 415/119 |
| 5,082,421 A | * | 1/1992 | Acton et al. | 415/118 |
| 5,275,528 A | * | 1/1994 | Freeman et al. | 415/1 |
| 5,363,450 A | * | 11/1994 | Moody et al. | 381/71.5 |
| 5,833,433 A | * | 11/1998 | May et al. | 415/115 |
| 5,841,079 A | * | 11/1998 | Parente | 181/214 |
| 6,004,095 A | * | 12/1999 | Waitz et al. | 415/119 |
| 6,055,805 A | * | 5/2000 | El-Aini et al. | 60/226.1 |
| 6,546,734 B2 | * | 4/2003 | Antoine et al. | 60/772 |
| 6,599,121 B2 | * | 7/2003 | Gutmark et al. | 431/182 |
| 7,085,388 B2 | * | 8/2006 | Butler et al. | 381/71.3 |
| 7,200,999 B2 | * | 4/2007 | Bagnall et al. | 60/785 |
| 8,313,286 B2 | * | 11/2012 | Beeck | 415/119 |

* cited by examiner

*Primary Examiner* — Forrest M Phillips
(74) *Attorney, Agent, or Firm* — Frommer Lawrence & Haug LLP; William S. Frommer (57) ABSTRACT

A noise reducer for reducing engine noise of a jet engine having a central axis and a main exhaust nozzle. The noise reducer includes a tubular member having ports at a distal end and is aligned along the central axis. The ports are located in the exhaust stream of the engine outside the main exhaust nozzle. A gaseous flow is injected into the exhaust stream from the ports in an angled direction with respect to the central axis.

15 Claims, 11 Drawing Sheets

Schlieren images of a Mach 1.6 axisymmetric jet with microjet location $\bar{x} = 0.5$. (a) $m_r = 0$, (b) $m_r = 0.017$, (c) $m_r = 0.031$, (d) $m_r = 0.044$, (e) $m_r = 0.057$, (f) $m_r = 0.070$.

Schlieren images of a Mach 1.6 axisymmetric jet with microjet location $\bar{x} = 1.0$. (a) $m_r = 0$, (b) $m_r = 0.017$, (c) $m_r = 0.030$, (d) $m_r = 0.044$, (e) $m_r = 0.057$, (f) $m_r = 0.070$.

Schlieren images of a Mach 1.6 axisymmetric jet with microjet location $\bar{x} = 1.5$. (a) $m_r = 0$, (b) $m_r = 0.017$, (c) $m_r = 0.030$, (d) $m_r = 0.044$, (e) $m_r = 0.057$, (f) $m_r = 0.070$.

Schlieren images of a Mach 1.6 axisymmetric jet with microjet location $\bar{x} = 2.0$. (a) $m_r = 0$, (b) $m_r = 0.016$, (c) $m_r = 0.030$, (d) $m_r = 0.045$, (e) $m_r = 0.057$, (f) $m_r = 0.070$.

Schlieren images of a Mach 1.6 axisymmetric jet with microjet location $\bar{x} = 2.5$. (a) $m_r = 0$, (b) $m_r = 0.017$, (c) $m_r = 0.030$, (d) $m_r = 0.043$, (e) $m_r = 0.057$, (f) $m_r = 0.070$.

Schlieren images of a Mach 1.6 axisymmetric jet with microjet location $\bar{x} = 3.0$. (a) $m_r = 0$, (b) $m_r = 0.017$, (c) $m_r = 0.030$, (d) $m_r = 0.043$, (e) $m_r = 0.058$, (f) $m_r = 0.070$.

Figure 8

OASPL reduction with respect to turbulent mixing noise (30°). $\bar{x}$ is the normalized effective length, x.

Figure 9

Power density spectrum showing effects of a noise reducer on sound pressure level at a 30 degree angle with respect to the central axis. $\bar{x}$ is the normalized effective length, x.

Figure 10

OASPL reduction with respect to turbulent mixing noise (90°). $\bar{x}$ is the normalized effective length, x.

Figure 11

Power density spectrum showing effects of a noise reducer on sound pressure level at a 90 degree angle with respect to the central axis. $\bar{x}$ is the normalized effective length, x.

HIGH-SPEED JET NOISE REDUCTION VIA FLUIDIC INJECTION

BACKGROUND

1. Field of the Invention

This invention relates generally to a method and apparatus for reducing jet engine noises of supersonic jet aircraft or subsonic jet aircraft.

2. Background Discussion

Supersonic and subsonic jet aircraft generate noises from several sources, such as engines, structures, and internal equipment. Jet engines have been recognized as a major noise source, generating noises that include inlet noise produced by inlet turbines, noise from bypass ducts, and noise produced by the exiting stream from the main engine exhaust nozzle. In general, the noise produced by a supersonic engine becomes more severe than a subsonic engine due to the high speed of the streams at the main exhaust nozzle and the presence of shock associated noise.

The intense noise radiation generated by jet aircraft capable of supersonic travel poses a direct threat to communities surrounding airports and persons in close proximity to these jet aircraft, such as on a jet aircraft carrier deck. Severe restrictions have been placed on these jet aircraft, limiting their travel in the supersonic region to so called supersonic corridors and over-water travel.

There has been a long-felt need to reduce noise associated with supersonic and subsonic jet aircraft. Efforts to reduce engine noise started as early as the 1950s. Despite many years of research and development, and notwithstanding noise reduction techniques, supersonic jet aircraft still suffer from intense noise generation without fully effective means of controlling the noise.

A number of approaches to reduce subsonic engine noise have been proposed and adopted by the aviation industry. For example, one approach includes the use of a passive device known as a lobe type mixing nozzle disposed at the exhaust of the engine. This nozzle forces the ambient air to mix at a faster rate with the exhaust stream, increasing the turbulent mixing rate and reducing the overall sound pressure level of the engine (OASPL). The main drawback to this type of nozzle is its heavy impact on the thrust of the engine due to the reduction in the exit area occupied by the device. An improved approach includes the use of a Chevron type nozzle.

Turbofan engines, which have been in operation for quite some time, were designed for efficient engine for transonic flight. Although not designed to reduce noise, some noise reduction is an unintended result.

Efforts to reduce the engine noise of supersonic jet aircraft have been attempted by many artisans in the field of endeavor for a long time. These techniques may be classified as "passive techniques" and "active techniques."

Passive techniques apply additional structures to engines to change exhaust flow characteristics. For example, a simple structure, a flexible filament disposed along the centerline of a supersonic jet engine, has been tested for its effects on reducing engine noise. However, the flexible filament is structurally unsound. A more complex structure, an x-shaped "wire device," has been located downstream of a supersonic jet engine, significantly modifying the stream structure of the engine. The usually-observed shock cell structure in other jet engines seems to be destroyed downstream of the device, leading to the reduction of all shock-associated noises. The x-shaped wire device, however, significantly alters the flight characteristics of a jet aircraft and dramatically increases the drag.

Active techniques mainly use microjet ports to inject either liquid or gaseous masses into streams exiting from jet engines. While the results of injecting liquid masses are promising, the practicality of liquid injection renders it severely limited as it requires the transport of a liquid source. Common applications of aqueous injection are seen in the noise reduction of launch vehicles, where the source needs not to be transported. Gaseous injection is a more practical approach to fluidic injection as the flow medium could be sourced from the compressor of the jet engine. Thus far, current techniques that inject gaseous masses still have unsolved issues when used in supersonic jet engines.

SUMMARY

In summary, the present disclosure applies both passive techniques and active techniques to reduce the engine noise of a jet aircraft. A tube is placed coaxially within a jet engine. The jet engine may be a supersonic jet engine (such as an engine designed to propel an aircraft at speeds faster than Mach 1.0). The jet engine may be a subsonic engine such as an engine designed to propel an aircraft at speeds lower than Mach 1.0. The jet engine may also be a transonic engine such as an engine designed to propel an aircraft at speeds between Mach 1.2 and Mach 0.8. The engine may have other noise reducing means, such as Chevron nozzles disposed at the main engine exhaust. The tube injects gaseous or liquid masses to the main stream through microjet ports located at the distal end of the tube in an angled direction. For example, the angled direction may be a direction perpendicular to the main stream, i.e. radially. The microjet ports simulate a point-injection method, which allows targeting at specific areas within the jet plume/stream, taking advantage of a so called "barrel shock" phenomena created during the injection into a supersonic stream. The present invention also introduces a "bow shock" upstream of the barrel shock, which forces the jet shear layer to shift or bulge outwards in the vicinity of the microjet ports, thus decreasing the turbulent mixing noise. Test results of an experimental device simulating the exhaust of a supersonic jet engine have shown that the invention as set forth in the present disclosure proves to be effective.

According to an embodiment, a noise reducer, in the form of a tube with equally spaced ports/microjets at its distal end, is placed along the center axis of the main exhaust nozzle of a supersonic jet engine and is immersed in the stream exiting from the main exhaust nozzle. The reducer both passively and actively alters the shell structures of stream exiting the main exhaust nozzle. The presence of the tube alone, the passive component, is found to reduce the overall sound pressure level (OASPL), via modification of the shock cell structures of the stream. The active component includes a gaseous medium injected perpendicularly or in an angled direction into the oncoming supersonic or sonic or subsonic cross flow via the microjet ports. Injection of the gaseous medium further increases the reduction in the OASPL via a modification of the internal shock cell structures, a modification of the shear layer of the stream at the nozzle exit, and an overall reduction in the length of the potential core of the stream exiting from the exhaust.

According to an embodiment, the noise reducer includes a tubular member disposed within the jet engine and having a plurality of ports at its distal end. The tubular member is aligned along the central axis and the ports are disposed in the exhaust stream outside the main exhaust nozzle. A gaseous flow is injected into the exhaust stream through the plurality of ports in an angled direction or in a direction substantially perpendicular to the central axis.

According to another embodiment, an aspect ratio of the tubular member is about 0.25 or less, the aspect ratio being defined as the ratio of the cross-section area of the tubular member to the cross-section area of the main exhaust nozzle.

According to yet another embodiment, the gaseous flow includes ambient air provided through a compressor or a bypass duct. The tubular member has an effective length between the main exhaust nozzle and the ports set to be between 0.5 times the diameter of the main exhaust nozzle and 3.0 times the diameter of the main exhaust nozzle. Preferably, the effective length is 2.5 times the diameter of the main exhaust nozzle.

According to yet another embodiment, the jet engine is operated at a supersonic speed, and the gaseous flow of the injectant exhibits a mass flow rate between about 1.7 percent and 7 percent of that of the mass flow rate of the exhaust stream. Preferably, the mass flow rate is about 7 percent of the mass flow rate of the exhaust stream. The gaseous flow is injected into the exhaust stream at a substantially supersonic, sonic, or subsonic speed. In one embodiment, the gaseous flow is injected at sonic speed and expands to supersonic speed; although the gaseous flow, once injected, may slow to subsonic speed.

According to another embodiment, the present disclosure is directed to a method for reducing noise in a jet engine generating an exhaust stream. The method includes introducing a central axis-aligned tubular structural member into the exhaust stream exiting a main exhaust nozzle of the jet engine and injecting a flow of gas at the distal end of the structural member in an angled direction or in a direction substantially perpendicular to the central axis of the jet engine.

According to yet another embodiment, the noise reducing method further includes setting an effective length of the structural member between the distal end of the structural member and the main exhaust nozzle. The method further includes setting the ratio of the mass flow of the injectant to the exhaust stream.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

Engines operating with supersonic exhaust velocities, such as those on a supersonic transport or military fighter jet, form a series of quasi-stationary shock cells having shock and expansion waves in their exhaust stream. Additional to this is the creation of a finite jet shear layer between the supersonic gaseous flow and the quiescent ambient air. These physical phenomena make up the jet noise component of jet aircraft noise and contain the following three constituents: (1) turbulent mixing noise, (2) screech tones, and (3) broadband shock noise.

A person of ordinary skill in the art would understand that the flow field generated by transverse injection into a high-speed flow typically produces several well-recognized characteristics, e.g., shockwaves, expansion fans, etc. The first flow feature includes a bow shock produced as a result of the freestream impacting on the high-speed flow. In this respect the injectant acts like a solid cylindrical body in the high-speed flow. After entering the high-speed flow, the underexpanded (when injectant pressure at the entrance to the high-speed flow is higher than the pressure of the high speed flow) injectant flow undergoes a rapid Prandtl-Meyer expansion surrounded by a barrel shock. A shock wave normal to the jet path, known as a Mach disk, terminates the barrel shock, and compresses the flow to the effective pressure. Downstream of the Mach disk, a counter rotating vortex pair is formed. Wake vortices are also formed.

Embodiments set forth in the present disclosure reduce engine noises both by modifying the jet shear layer and by modifying and weakening the internal shock structures of the exhaust stream, thus attacking all three constituents of engine noises simultaneously.

Figure 1:
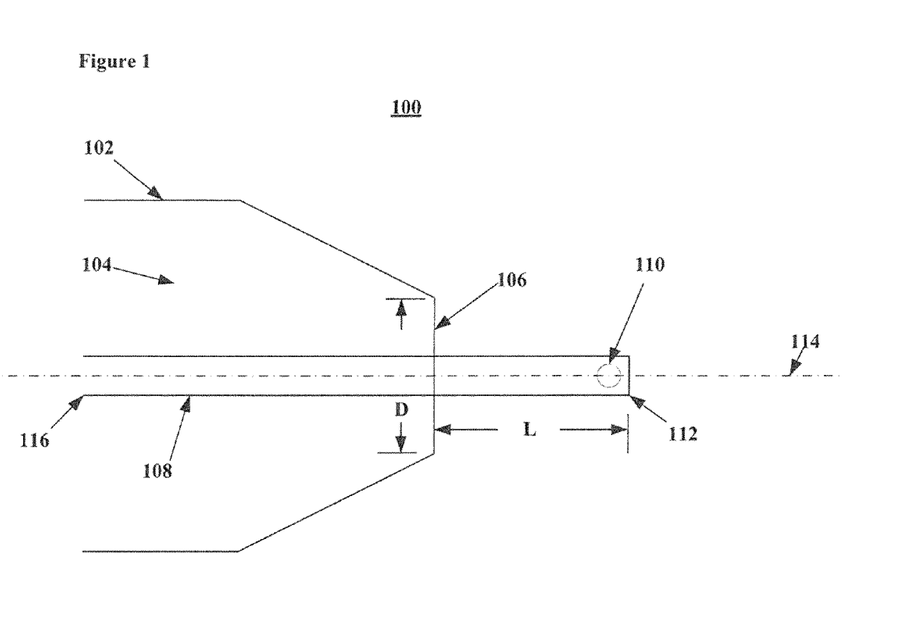
FIG. 1 shows an exemplary jet engine having a noise reducer according to an embodiment of the present invention.

FIG. 1 shows an exemplary jet engine having a noise reducer according to an embodiment of the present invention.

The jet engine 100 includes an engine body 102 that forms an engine chamber 104 and a main exhaust nozzle 106. The jet engine 100 further includes a noise reducer in the form of a tubular member 108 secured to the jet engine 100 by secure means (not shown) and placed along a central axis 114 of the jet engine 100. Jet fuels and ambient air are compressed by compressors (not shown) and injected into the engine chamber 104. Upon ignition, the fuel/air mixture combusts and forces gaseous streams to exit through the main exhaust nozzle 106, thus producing thrust. The jet engine may also include a bypass duct (not shown) that directs accelerated ambient air around the main exhaust nozzle 106.

The tubular member 108 is a hollow member, for example, formed of brass, and is disposed along the central axis 114. The tubular member 108 further extends to outside of the main exhaust nozzle 106 by a predetermined length, L, which is called the "effective length" in the following disclosure. The tubular member 108 includes a distal end 112 and a proximal end 116. The distal end 112 of the tubular member is closed and is placed in the exhaust stream outside the main exhaust nozzle 106. The proximal end 116 of the tubular member 108 may be connected with a compressor (not shown) that compresses injectants, such as ambient air, nitrogen, or other gas, into the tubular member 108. According to one embodiment, the proximal end 116 may be left open inside the chamber 104 so that streams enter the tubular member 108 through the proximal end 116. Microjet ports 110 in the tubular member are placed in proximity to the distal end 112. Injectants in the tubular member 108 are forced out of the tubular member 108 through the microjet ports 110 in a traverse direction that forms an angle with respect to the central axis 114. The angle may be ranged from 1 degree to 179 degrees. According to an embodiment, injectants in the tubular member 108 are preferably forced out of the tubular member 108 in a direction perpendicular to the central axis 114.

The tubular member 108 may be made of brass, stainless steel, or any other materials that are suitable for use in a jet engine. An aspect ratio, i.e., the ratio of the area of the cross-section of the tubular member 108 to the cross-section area of the main exhaust nozzle 106 at the exit of the exhaust, is selected to not significantly reduce the exhaust area defined by the main exhaust nozzle 106. According to an embodiment, the aspect ratio is no greater than 0.5. According to another embodiment, the aspect ratio is preferably 0.25 or less. According to another embodiment, the minimum aspect ratio is determined according to the structural requirement of the tubular member. The effective length L of the part of the tubular member that extends outside the main exhaust nozzle 106 is selected to effectively modify the flow characteristics of the exhaust stream. According to one embodiment, the effective length is between 0.5 and 3.0 times the diameter D of the exit of the main exhaust nozzle 106. According to another embodiment, the effective length is preferably 2.5 to 3.0 times the diameter D of the main exhaust nozzle 106.

Microjet ports 110 are fabricated at the distal end 112 of the tubular member 108 and are equally spaced around the centerline axis 114, forming an array. According to one embodiment, four microjet ports are fabricated and spaced apart by 90 degree angles. According to another embodiment, six microjet ports are fabricated and spaced apart by 60 degree angles. All of the microjet ports exhibit equal areas, and the area of each microjet port is selected to form a microjet flow or a point flow exiting from the port. According to one embodiment, the area of a microjet port is preferably no more than 25% of the area of the cross-section of the tubular member 108. When both the microjet port 110 and the tubular member 108 have a circular shape, the diameter of the microjet 110 is preferably no more than half the cross-section of the tubular member 108. According to another embodiment, the area of a microjet port 110 is preferably no more than 4% of the area of the cross-section of the tubular member 108. When both the microjet port 110 and the tubular member 108 have a circular shape, the diameter of the microjet port 110 is preferably no more than one fifth that the diameter of the tubular member 108.

The mass flow injected out through the microjet ports may be gaseous or liquid or the combination thereof. When a gaseous flow is injected, air provided through the compressor may be used as the mass. The velocity of injectant flow may be a subsonic, sonic, or supersonic flow. A person of ordinary skill in the art would recognize that, in general, a subsonic flow has a speed lower than Mach 1, a transonic flow has a speed between Mach 0.8 and Mach 1.2, and a supersonic flow has a speed greater than Mach 1. In general, the mass flow rate of the injectant is determined by the velocity of the injectant fluid, the density of the injectant fluid, and the area of the microjet ports. According to one embodiment, the mass flow rate of the injectants preferably is between 0.1 percent and 10 percent of the mass flow rate of the stream exiting from the main exhaust nozzle 106. According to another embodiment, the mass flow rate of the injectants preferably is between 1.7 percent and 7 percent of the mass flow rate of the stream exiting from the main exhaust nozzle 106. In one embodiment, the gaseous flow is injected at sonic speed and expands to supersonic speed. In yet another embodiment, the gaseous flow is injected at sonic speed and slows to subsonic speed The shapes of the microjet ports 110 are not limited to a circular shape. The microjet ports 110 may have an elliptical shape or a rectangular shape. Likewise, the cross-section of tubular member 108 is not limited to a circular shape. The cross-section of the tubular member 108 may have a shape similar to that of the chamber 104 or the main exhaust nozzle 106. Furthermore, the shape of the tubular member 108 may change along the central axis 114 in order to be consistent with that of the engine body 102 and the main exhaust nozzle 106. According to another embodiment, the tubular member 108 may be provided with perforations in the part that is inside the chamber 104 so that gases from the stream inside the chamber 104 may enter the tubular member 108 through such perforations and then be injected out through the microjet ports 110. According to another embodiment, a predetermined section of the tubular member that is close to the distal end 112 may have a gradually increasing funnel shape whose size gradually increases to the distal end 112. Such a funnel shape may direct additional exhaust streams to a traverse direction, thus increasing the noise reducing effect.

According to a further embodiment, the tubular member 108 may be used with other noise reduction technologies to reduce the engine noise. For example, the jet engine 100 may use both chevron nozzles and the tubular member 108 to reduce the engine noise. As another example, the jet engine 100 may also use a "bypass duct" with the tubular member 108 to reduce the engine noise.

According to a further embodiment, the jet engine 100 may be used in a supersonic or subsonic jet aircraft. The tubular member 108 itself may be a noise reducer without injecting a fluid. Upon the departure or landing of an aircraft, the injection of a fluid may be used together with the tubular member to reduce noise. When an aircraft is cruising, the injecting of the fluid may be shut off. According to some embodiments, the microjet ports may also be omitted from the tubular member when the noise reduction requirement is not expected to be as high as that requiring a tubular member with microjet ports.

Figure 8:
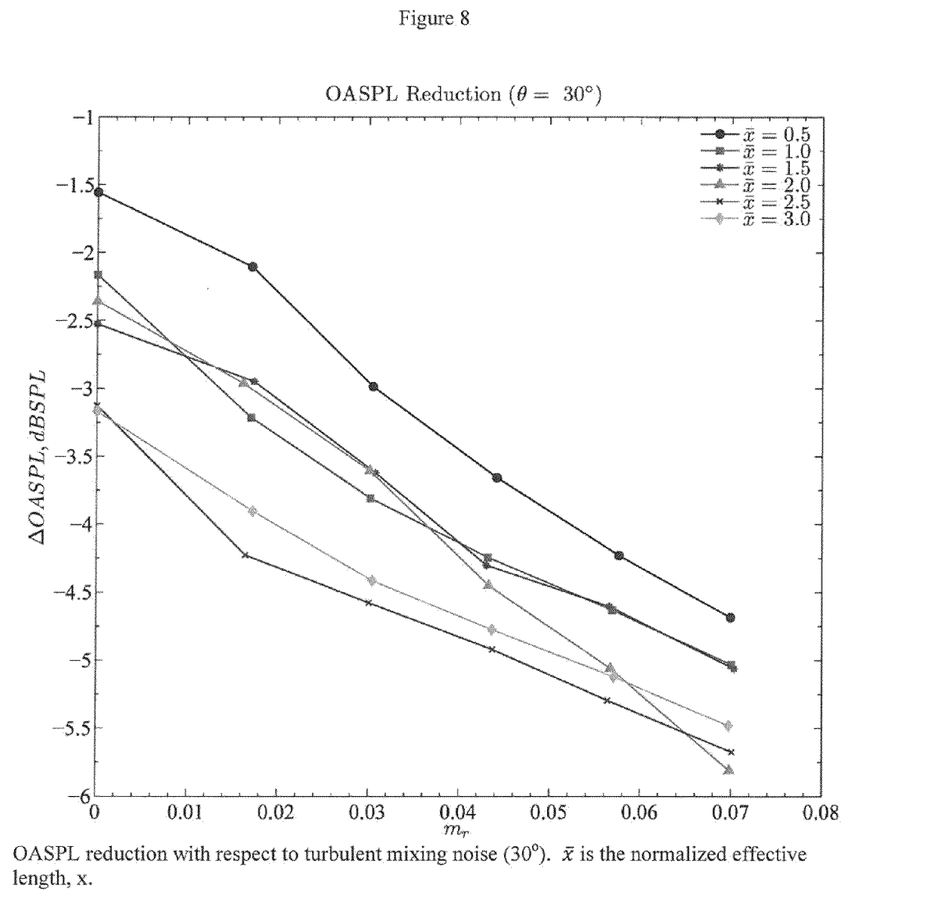
FIG. 8 shows OASPL (measured through an acoustic pressure sensor such as a microphone placed at a 30° angle with respect to the central axis) of various testing apparatus having a normalized effective length, $\bar{x}$, from 0.5 to 3.0.
Figure 9:
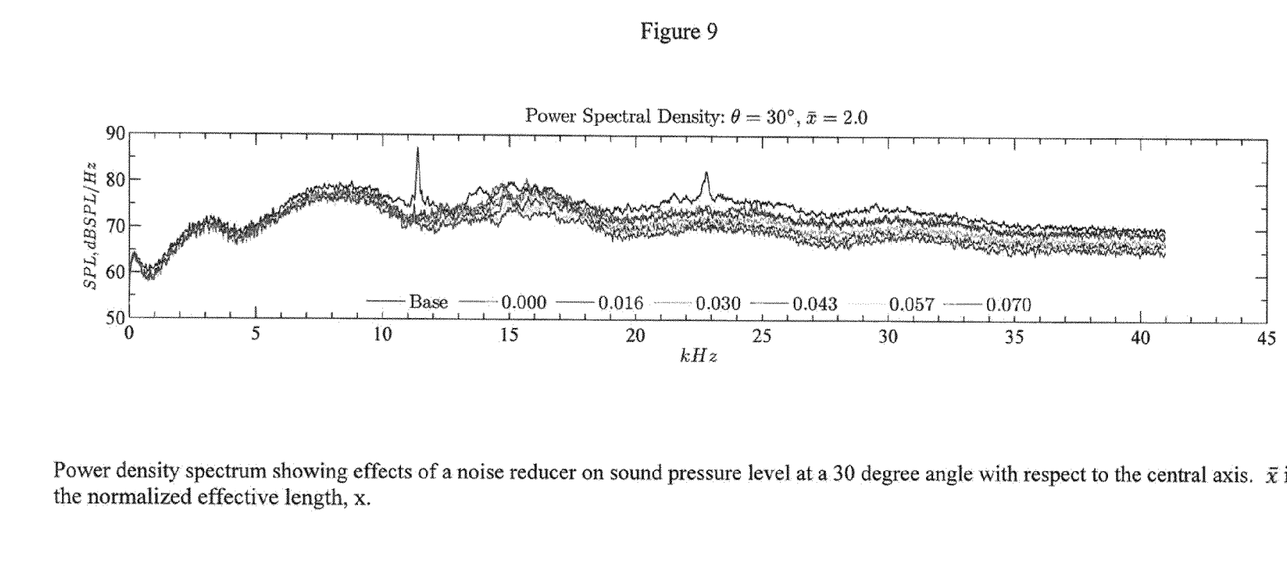
FIG. 9 shows power spectral density (PSD) measured through an acoustic pressure sensor such as a microphone placed at a 30° angle with respect to the central axis. The various testing apparatus have a normalized effective length, $\bar{x}$=2.0, and a mass-flux ratio $m_r$ between 0 and 0.07.
Figure 10:
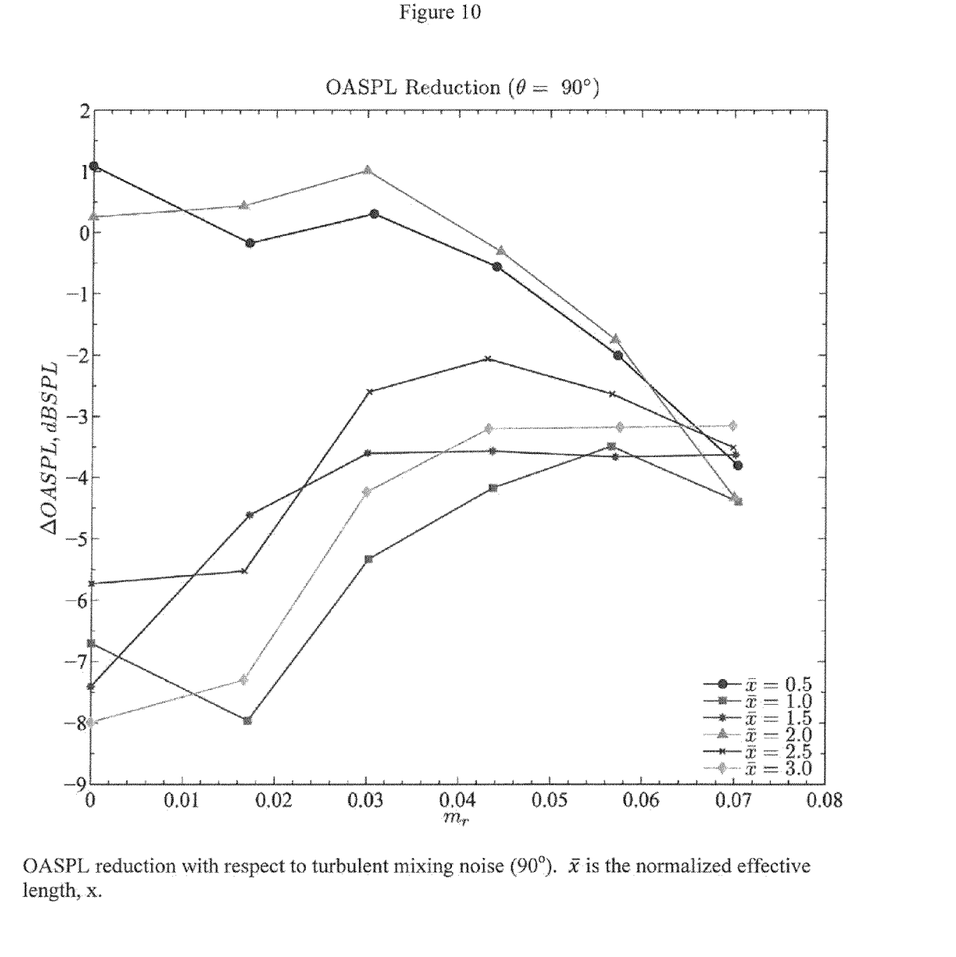
FIG. 10 shows OASPL (measured through an acoustic pressure sensor such as a microphone placed at a 90° angle with respect to the central axis) of various testing apparatus having a normalized effective length, $\bar{x}$, from 0.5 to 3.0.
Figure 11:
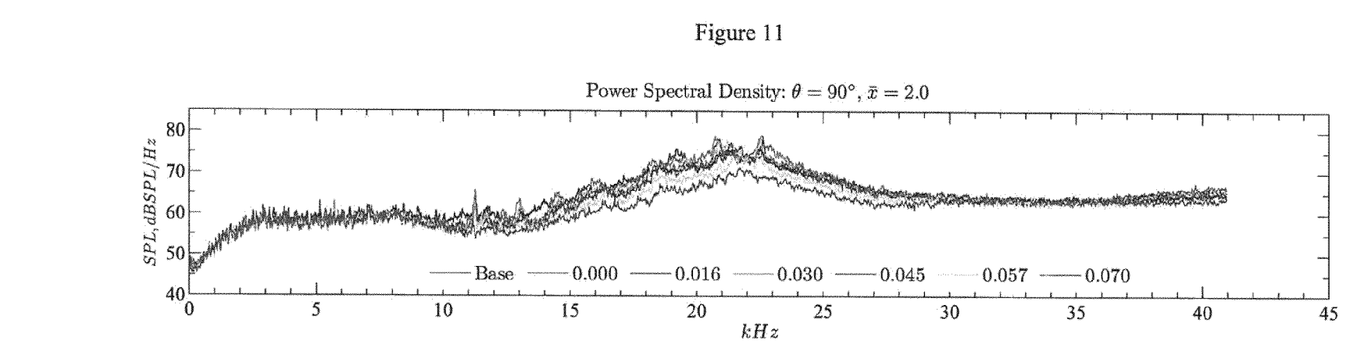
FIG. 11 shows power spectral density (PSD) measured through an acoustic pressure sensor such as a microphone placed at a 90° angle with respect to the central axis. The various testing apparatus have a normalized effective length, $\bar{x}$=2.0, and a mass-flux ratio m, between 0 and 0.07.

FIGS. 2-10 illustrate test results according to various embodiments of the present invention. FIGS. 2a-2f show Schlieren images of flow characteristics of a stream from test apparatus having a normalized effective length $\bar{x}$ of 0.5. The normalized effective length (L/D) represents a ratio of the effective length L to the diameter of the main exit nozzle D. FIGS. 3a-3f show Schlieren images of flow characteristics of a stream from test apparatus having a normalized effective length $\bar{x}$ of 1.0. FIGS. 4a-4f show Schlieren images of flow characteristics of a stream from test apparatus having a normalized effective length $\bar{x}$ of 1.5. FIGS. 5a-5f show Schlieren images of flow characteristics of a stream from test apparatus having a normalized effective length $\bar{x}$ of 2.0. FIGS. 6a-6f show Schlieren images of flow characteristics of a stream from test apparatus having a normalized effective length $\bar{x}$ of 2.5. FIGS. 7a-7f show Schlieren images of flow characteristics of a stream from test apparatus having a normalized effective length $\bar{x}$ of 3.0. FIG. 8 shows OASPL (measured through an acoustic pressure sensor such as a microphone placed at a 30° angle with respect to the central axis) of various test apparatus having a normalized effective length $\bar{x}$ from 0.5 to 3.0. FIG. 9 shows power spectral density (PSD) of various testing apparatus having a normalized effective length, $\bar{x}$=2.0, and a mass-flux ratio $m_r$ between 0 and 0.07. The power spectral density shows the sound pressure level corresponding to a frequency spectrum ranging from 0 Hz to 45 kHz. The power spectral density was measured through an acoustic pressure sensor such as a microphone placed at a 30° angle with respect to the central axis. FIG. 10 shows OASPL (measured through an acoustic pressure sensor such as a microphone placed at a 90° angle with respect to the central axis) of various test apparatus having a normalized effective length $\bar{x}$ from 0.5 to 3.0. FIG. 11 shows power spectral density (PSD) measured through an acoustic pressure sensor such as a microphone placed at a 90° angle with respect to the central axis. The various testing apparatus have a normalized effective length, $\bar{x}$=2.0, and a mass-flux ratio $m_r$ between 0 and 0.07.

Figure 2A:
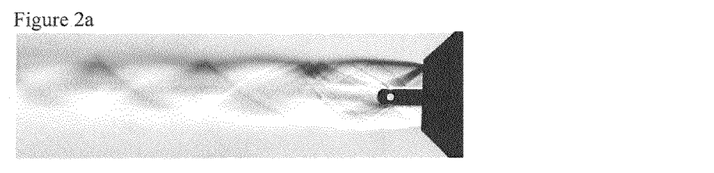
FIGS. 2a-2f show Schlieren images of flow characteristics of a stream from test apparatus having a normalized effective length, $\bar{x}$, of 0.5.
Figure 2B:
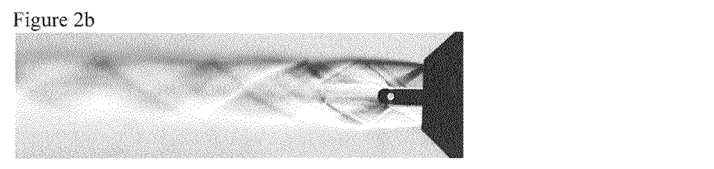
Figure 2C:
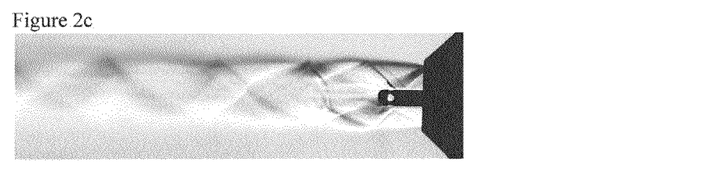
Figure 2D:
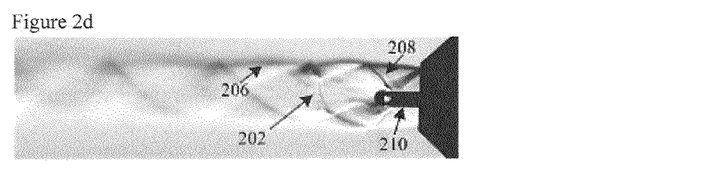
Figure 2E:
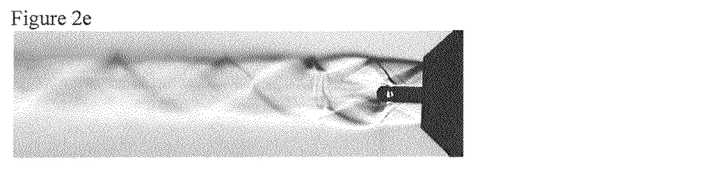
Figure 2F:
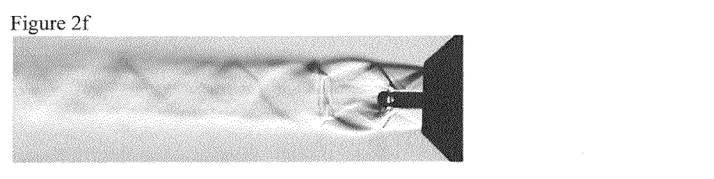
Figure 3A:
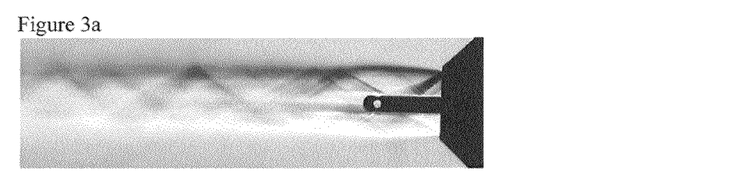
FIGS. 3a-3f show Schlieren images of flow characteristics of a stream from test apparatus having a normalized effective length, $\bar{x}$, of 1.0.
Figure 3B:
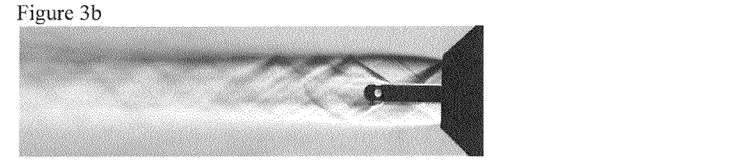
Figure 3C:
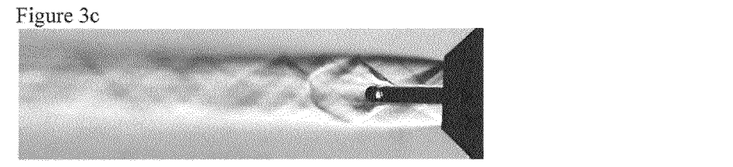
Figure 3D:
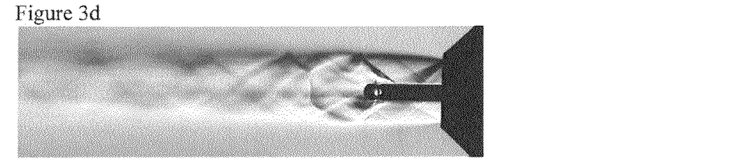
Figure 3E:
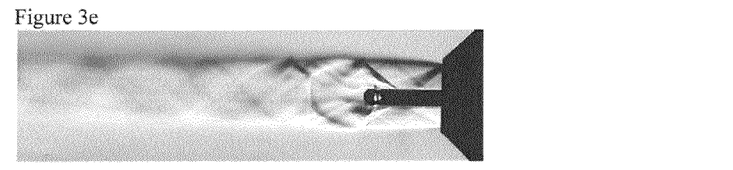
Figure 3F:
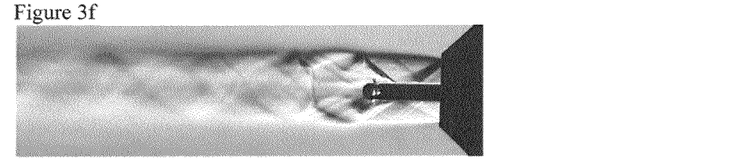
Figure 4A:
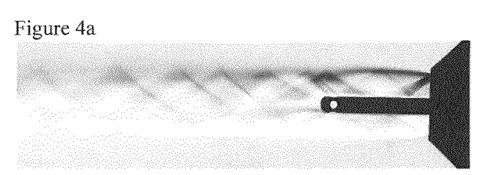
FIGS. 4a-4f show Schlieren images of flow characteristics of a stream from test apparatus having a normalized effective length, $\bar{x}$, of 1.5.
Figure 4B:
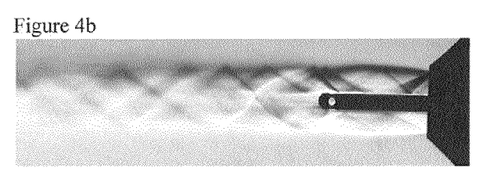
Figure 4C:
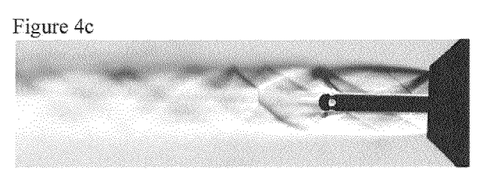
Figure 4D:
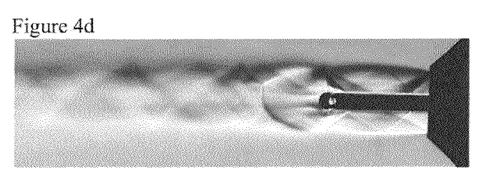
Figure 4E:
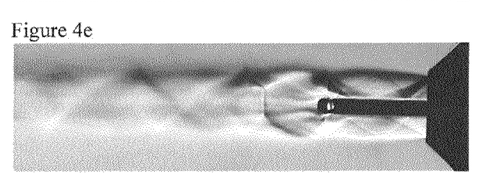
Figure 4F:
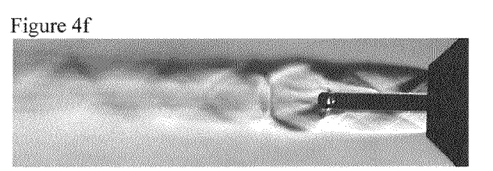
Figure 5A:
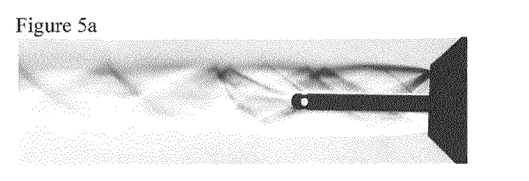
FIGS. 5a-5f show Schlieren images of flow characteristics of a stream from test apparatus having a normalized effective length, $\bar{x}$, of 2.0.
Figure 5B:
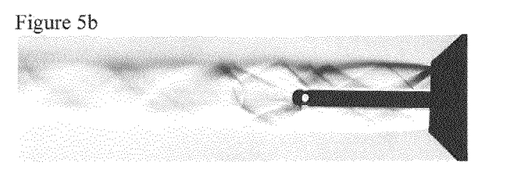
Figure 5C:
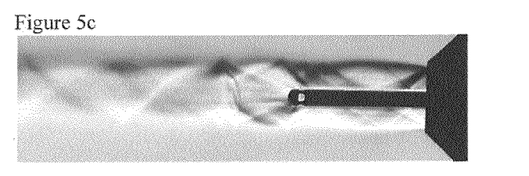
Figure 5D:
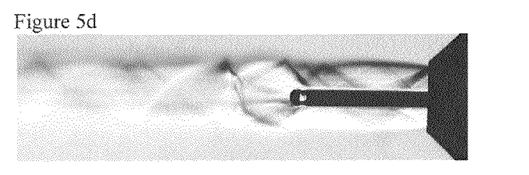
Figure 5E:
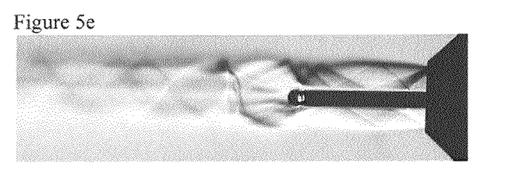
Figure 5F:
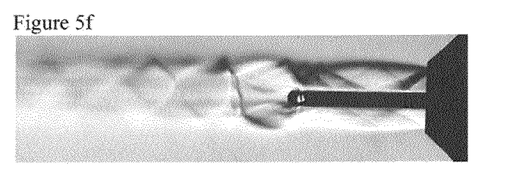
Figure 6A:
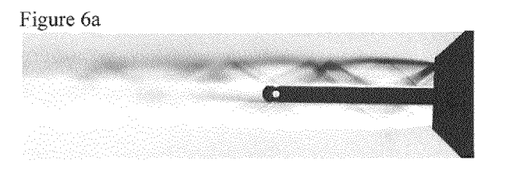
FIGS. 6a-6f show Schlieren images of flow characteristics of a stream from test apparatus having a normalized effective length, $\bar{x}$, of 2.5.
Figure 6B:
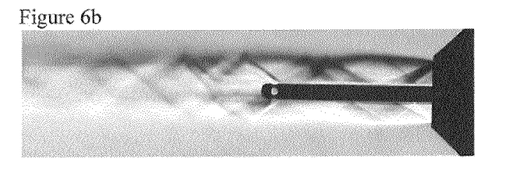
Figure 6C:
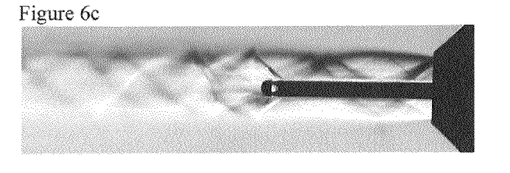
Figure 6D:
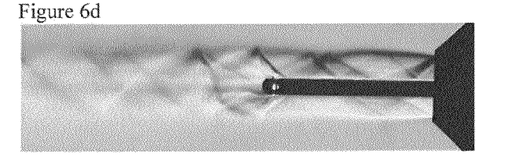
Figure 6E:
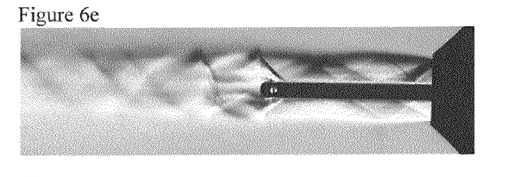
Figure 6F:
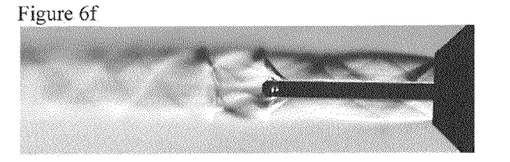
Figure 7A:
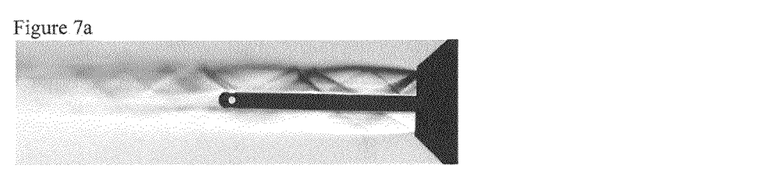
FIGS. 7a-7f show Schlieren images of flow characteristics of a stream from test apparatus having a normalized effective length, $\bar{x}$, of 3.0.
Figure 7B:
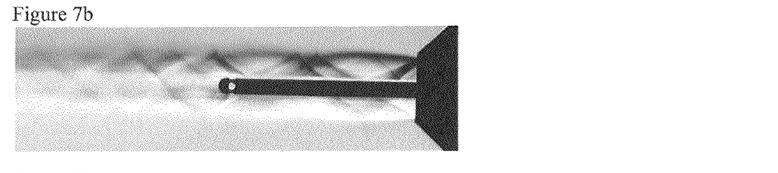
Figure 7C:
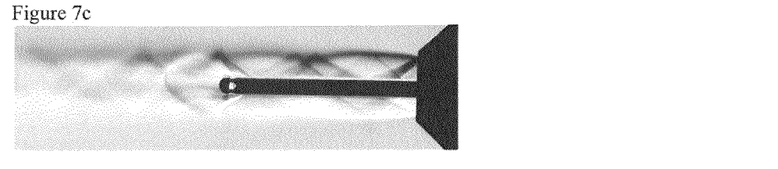
Figure 7D:
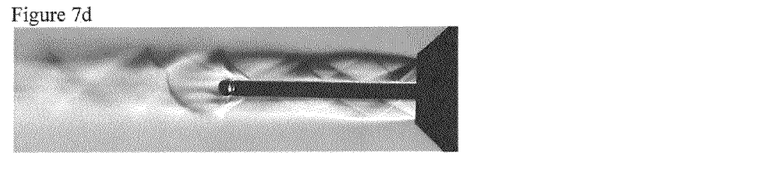
Figure 7E:
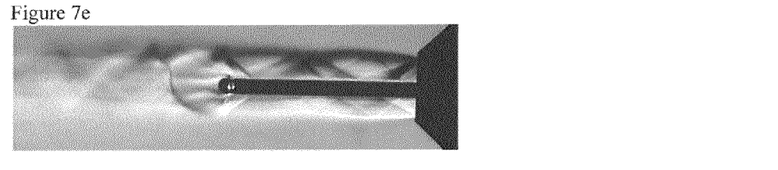
Figure 7F:
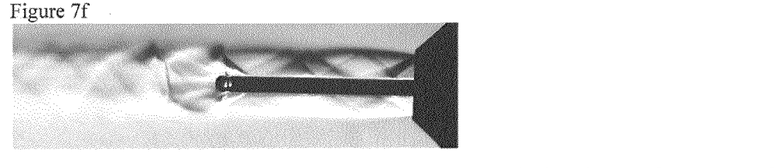

Representative shock structures have been identified in FIG. 2d due to the introduction of the tubular member and mass flow in the exhaust stream. FIG. 2d shows a noise reducer 210 having a normalized effective length $\bar{x}$ of 0.5. The mass flow ratio was 0.031. (A mass flow ratio is defined as the ratio of the mass flow rate of the injected fluid to the mass flow rate of the exhaust stream.) Upstream of the microjet port of the noise reducer 210, a bow shock 208 is formed. Downstream of the microjet port, a Mach disk 202 is observed. The exhaust stream is still not fully expanded, as being confined by the shear boundary layer 206. It is noted that the shock structures as labeled in FIG. 2d are also observed in other noise reducers such as those illustrated in FIGS. 2b-2f, FIGS. 3b-3f, FIGS. 4b-4f, FIGS. 5b-5f, FIGS. 6b-6f, and FIGS. 7b-7f. As the noise reducers in FIGS. 2a, 3a, 4a, 5a, 6a, and 7a did not inject any fluid, shock structures such as barrel shock and Mach disk were not observed.

An experimental apparatus that simulates a jet engine operable at a Mach 1.6 number was tested with different noise reducers according to various embodiments as set forth in the present disclosure. In the various embodiments, the aspect ratio was about 0.25. The tubular member was made of brass and has a circular cross-section shape with four microjet ports equally distributed at the distal end. The effective length of the tested noise reducers was changed respectively from about half of the diameter of the main exhaust nozzle to about three times the diameter of the main exhaust nozzle. The mass flow rate of the injectants was respectively changed from about 1.6 percent of the mass flow rate of the main exhaust stream to about 7 percent of the mass flow rate of the main exhaust stream, i.e., the mass flow ratio ranges from 0.016 to 0.07. The injectants included nitrogen gas. Schlieren images, OASPL, and power spectrum densities (PSD) were obtained to demonstrate the effects of the noise reducer on the flow characteristics and the noise reduction of the exhaust stream.

Schlieren images are shown in FIGS. 2-7. The mass flow ratio is represented by $m_r$. The effective length L is represented by $\bar{x}$ of the noise reducer, as shown in FIG. 1, and is normalized with respect to the diameter of the main exhaust nozzle ($\bar{x}$=L/D).

In general, the presence of the microjet alone ($m_r$=0), even without injecting any fluid, is observed to cause the introduction of additional shock structures into the exhaust stream due to the shock reflection between the wall of the tubular member and the shear layer in the exhaust stream (image (a) in FIGS. 2-7). The presence of the tubular member 108 also introduces the formation of a wake region immediately downstream of the distal end of the tubular member.

As the injection mass-flow ratio is increased slightly to 0.017 (image(b) in FIGS. 2-7), the shear layer in the immediate vicinity of the microjet ports begins to bulge outwards, causing a decrease in the turbulent mixing noise OASPL, as shown graphically in FIG. 8.

At lower mass flow ratios $m_r$ in the range of, for example, 0.017 to 0.031 (images (b) and (c) of FIGS. 2-7), the shocks intersecting immediately downstream of the microjet ports begin to separate from one another, forming a small Mach disk. Further increasing the mass flow ratio $m_r$, up to a maximum of, for example, 0.070, appears to greatly increase the size of the Mach disk, as shown in FIGS. 2-7, and is also observed to increase the bulging of the shear layer (images (d), (e) and (f) of FIGS. 2-7).

The shape of Mach disks is found to have some asymmetry when the normalized effective length of the noise reducer, i.e., tubular member 108, increases. The vibration of the tubular member 108 within the exhaust flow introduces some unsteadiness into the exhaust plume, therefore causing the asymmetry. The Mach disk location relative to the end of the noise reducer is found to be independent of the mass flow ratio, while the size of the Mach disk shows a strong dependence on the mass flow ratio. The size of the Mach disk, and the bulging of the shear layer mentioned earlier, is observed to be proportional to the mass flow ratio. Moreover, an increase in the mass flow ratio is also observed to reduce the overall length of the exhaust plume and hence decrease the shock cell length downstream of the introduced Mach disk.

According to some embodiments, it is preferable that the size of the Mach disk is obtained to the point that the flow downstream of the disk is rendered subsonic by increasing the insertion depth of the microjet, and introducing the barrel shock further downstream in the exhaust.

FIG. 8 graphically represents the effect of reducing OASPL as the mass flow ratio and the effective length increase. The horizontal axis of FIG. 8 represents the mass flow ratio $m_r$, while the vertical axis of FIG. 8 represents the reduction of OASPL. The OASPL was measured through an acoustic pressure sensor such as a microphone placed at a 30 degree angle with respect to the central axis of the jet engine. Noises obtained at the 30 degree angle location are deemed to represent the turbulent mixing noise.

An almost linear trend between the reduction in the turbulent mixing noise OASPL, as the mass flow ratio increases, is observed. For all effective length of the tubular member, as the mass flow ratio is increased, an increase in the OASPL reduction is observed. At $\bar{x}$=0.5, the noise reducer is least effective in reducing the OASPL because it does not exert enough influence on the shear layer to promote a strong increase in the turbulent mixing. However, further advancement of the microjet ports downstream of the nozzle exit, i.e., increasing the effective length L, appears to have significant effects in the reduction of the OASPL. At $\bar{x}$=1.0 and $\bar{x}$=1.5, the reduction of the OASPL becomes heavily dependent on the mass flow ratio, as compared with that of the position of microjet ports, i.e., the effective length of the tubular member L. The test results indicate that the effect on the reduction in the OASPL at $\bar{x}$=1.0 and $\bar{x}$=1.5 are virtually the same. At $\bar{x}$=2.5 and $\bar{x}$=3.0, the data shows a large increase in the OASPL reduction level compared to that of other values of $\bar{x}$. The introduction of the microjet ports into shock cells further downstream of the nozzle influences a larger portion of the shear layer, as a result of both the injectant introduced at that point and the body of the tubular member. This allows for an overall greater influence on the shear layer of the jet exhaust stream and thus, an overall greater increase in the turbulent mixing. The reduction in OASPL is greater at $\bar{x}$=2.5 than at $\bar{x}$=3.0, due to the fact that the injection location is disposed more closely at the center within the shock cell as opposed to the edges where the shock cells intersect, allowing the injection medium to more effectively influence the shear layer.

When $\bar{x}$=2.0 for lower mass flow ratios in the range of, for example, 0 to 0.03, the OASPL reduction follows the same trends and approximate levels as that when $\bar{x}$=1.0, and $\bar{x}$=1.5. However, for the higher mass flow ratios, for example, from 0.04 to 0.07, the reduction levels surpass that for $\bar{x}$=2.5 and $\bar{x}$=3.0 locations with a maximum reduction of 5.81 dBSPL, for $\bar{x}$=2.0. It is determined that the introduction of the Mach disk at this location allows the injectants to influence the shear layer in a more optimal manner.

Additionally, test results indicate a reduction in the OASPL of up to 3.17 dBSPL with respect to turbulent mixing noise can be achieved by the mere placement of the tubular member 108 within the exhaust flow, with greater reduction being dependent on the effective length L, or the normalized effective length $\bar{x}$. This indicates that during non-essential phases of the flight, the active component of the noise reducer, i.e., fluidic injection, can be switched off while keeping some of its noise reduction capabilities.

FIG. 9 illustrates the effects of a noise reducer ($\bar{x}$=2.0) on the power spectral density (PSD). The horizontal axis of FIG. 9 represents the acoustic frequency, while the vertical axis of the Figure represents the sound pressure level (SPL). The power spectral density was measured through an acoustic pressure sensor such as a microphone placed at a 30 degree angle with respect to the central axis of the jet engine.

It has been observed that two distinct screech/peak tones are located at 11.39 kHz and 22.79 kHz in the baseline spectra (when no noise reducer is installed) of the Mach 1.6 jet engine. These tones are eliminated whenever a noise reducer according to the present disclosure is installed. Although the mere placement of the noise reducer tubular member into the exhaust flow is able to remove these tones from the spectra, fluid injection is observed to have a strong influence in altering the spectral composition of the jet at frequencies greater than 5 kHz. Introduction of the injectant is observed to flatten the spectra above the 10 kHz band.

FIG. 10 illustrates the effect of the noise reducer on the broadband shock associated noise. The horizontal axis of FIG. 10 represents the mass flow ratio, $m_r$, while the vertical axis of FIG. 10 represents the reduction of OASPL. The OASPL was measured at a 90 degree angle location with respect to the central axis of the jet engine.

An increase in the mass flow ratio resulted in a general decrease in the broadband shock noise OASPL reduction for $\bar{x}$=1.0, 1.5, 2.5, and 3.0. A maximum noise reduction (up to 7.9 dBSPL) with respect to broadband shock noise is achieved by placing the noise reducer within the engine exhaust flow without injection. A decrease in OASPL reduction of broadband shock noise is attributed to the fact that the fluid injection into the engine exhaust flow gives rise to additional shock structures from both the noise reducer and the highly underexpanded injection flow, e.g., barrel shock and shock reflections.

According to FIG. 10, these additional shock structures may reduce overall effectiveness by adding additional sources of broadband shock noise. For $\bar{x}$=0.5 and 2.0 locations, the introduction of the tubular member itself seems to increase the broadband shock noise up to 1.09 dBSPL if no fluid is injected. In the case of $\bar{x}$=0.5, the tubular member may interact with the eddy structures of the engine exhaust near the nozzle tip, producing excess shock noise. When $\bar{x}$=2.0, while optimal for reducing turbulent mixing noise, a unique shock interaction is produced which negatively affects the reduction of the broadband shock noise OASPL. Increasing the mass flow ratio for $\bar{x}$=0.5 and 2.0 to $m_r$=0.44 and 0.45 (not shown) respectively, regains some of the noise reduction; however, these two normalized lengths are the least effective, for the most part. Interestingly, at a mass flow ratio of $m_r$=0.70 (not shown), $\bar{x}$=2.0 proves to be one of the most effective normalized lengths in reducing the broadband shock noise OASPL; similar to what is found with respect to the turbulent mixing noise OASPL.

FIG. 11 illustrates the effects of a noise reducer ($x\bar{x}$=2.0) on the power spectral density (PSD) of broadband shock noise. The horizontal axis of FIG. 11 represents the acoustic frequency, while the vertical axis of the Figure represents the sound pressure level (SPL). The power spectral density was measure through an acoustic pressure sensor such as a microphone placed at a 90 degree angle with respect to the central axis of the jet engine.

Analysis of the PSD reveals no truly distinct peak/screech tones of the baseline and shows that fluid injection by the noise reducer 108 is effective in altering the spectra above the 10 kHz band at the 90 degree angle position. These shifts in the broadband shock noise spectral compositions are also observed for $\bar{x}$=1.5 and 3.0 where the spectrum is nearly flattened for the no-injection cases (not shown).

The embodiment as set forth in the present disclosure attacks the noise generating mechanisms of the jet exhaust from within the exhaust flow itself, which produces better results than using either a passive device or an active device respectively. The active and passive aspects of the embodiments have the ability to control noise to a prescribed level based on operational requirements and limitations, for example, to turn off the fluid injection when an aircraft is in a cruise state. The present invention may be used in the aviation industry, industrial plants with steam/gas stack exhausts, or any device which exhausts gas at a high velocity and requires a noise reduction.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A noise reducer for reducing engine noise of a jet engine having a central axis and a main exhaust nozzle, the noise reducer comprising:
    a tubular member disposed within the jet engine and having a plurality of ports at a distal end of the tubular member, wherein the tubular member is aligned along the central axis, and the ports are disposed in the exhaust stream outside the main exhaust nozzle,
    wherein the tubular member has an aspect ratio of between 0 and 0.25, the aspect ratio being defined as a ratio of a cross-section area of the tubular member to a cross-section area of the main exhaust nozzle; and
    wherein a gaseous flow is injected into the exhaust stream through the plurality of ports in an angled direction with respect to the central axis.

2. The noise reducer according to claim 1, wherein the jet engine is operated at a supersonic speed.

3. The noise reducer according to claim 1, wherein the gaseous flow includes air.

4. The noise reducer according to claim 1, wherein said tubular member has an effective length between the main exhaust nozzle and the ports set to be between 0.5 times the diameter of the main exhaust nozzle and 3.0 times the diameter of the main exhaust nozzle.

5. The noise reducer according to claim 4, wherein the effective length is 2.5 times the diameter of the main exhaust nozzle.

6. The noise reducer according to claim 1, wherein the jet engine is operated at a supersonic speed, and the gaseous flow exhibits a mass flow rate between about 1.6 percent and 7 percent of the mass flow rate of the exhaust stream.

7. The noise reducer according to claim 6, wherein the mass flow rate is about 7 percent of the mass flow rate of the exhaust stream.

8. The noise reducer according to claim 1, wherein the gaseous flow is injected into the exhaust stream at a sonic speed.

9. The noise reducer according to claim 1, wherein the jet engine is operated at a subsonic speed.

10. The noise reducer according to claim 1, wherein the jet engine is operated at a sonic speed.

11. The noise reducer according to claim 1, wherein the gaseous flow is injected into the exhaust stream through the plurality of ports in a direction substantially perpendicular to the central axis.

12. A method for reducing noise in a jet engine generating an exhaust stream, comprising:
    introducing a central axis-aligned tubular structural member in the exhaust stream exiting a main exhaust nozzle of the jet engine, the tubular member having an aspect ratio of between 0 and 0.25, with the aspect ratio being defined as a ratio of a cross-section area of the tubular member to a cross-section area of the main exhaust nozzle; and
    injecting a flow of gas at an end of the structural member in an angled direction with respect to the central axis of the jet engine.

13. The method according to claim 12, further comprising:
    setting an effective length of the structural member between the distal end of structural member and the main exhaust nozzle.

14. The method according to claim 12, further comprising:
    setting a ratio of the mass flow rate of the gaseous flow to the exhaust stream.

15. The method according to claim 12, wherein the flow of gas is injected in a direction substantially perpendicular to the central axis of the jet engine.

* * * * *